US009148001B1

(12) United States Patent  
Mohanty et al.

(10) Patent No.: US 9,148,001 B1
(45) Date of Patent: Sep. 29, 2015

(54) INTELLIGENT CABLE MECHANISM

(75) Inventors: Soumendra Mohanty, San Jose, CA (US); Ning Zhu, San Jose, CA (US)

(73) Assignee: ANALOGIX SEMICONDUCTOR, INC., Santa Clara, CA (US)

( * ) Notice: Subject to any disclaimer, the term of this patent is extended or adjusted under 35 U.S.C. 154(b) by 744 days.

(21) Appl. No.: 13/371,110

(22) Filed: Feb. 10, 2012

Related U.S. Application Data

(60) Provisional application No. 61/442,131, filed on Feb. 11, 2011.

(51) Int. Cl.
*H04L 12/14* (2006.01)
*H02G 3/00* (2006.01)

(52) U.S. Cl.
CPC ...................................... *H02G 3/00* (2013.01)

(58) Field of Classification Search
CPC ........... H01R 11/00; H04L 2/10; H04L 12/14
USPC ............ 307/147; 725/135, 110, 131; 370/463
See application file for complete search history.

(56) References Cited

U.S. PATENT DOCUMENTS

| 7,331,819 | B2 * | 2/2008 | Nelson et al. | ................. 439/577 |
| 2007/0054550 | A1 * | 3/2007 | Cuthbert et al. | ............... 439/607 |
| 2007/0058666 | A1 * | 3/2007 | Pratt | ............................. 370/463 |
| 2007/0232098 | A1 * | 10/2007 | Danner | ........................ 439/131 |

* cited by examiner

*Primary Examiner* — Rexford Barnie
*Assistant Examiner* — Joseph Inge
(74) *Attorney, Agent, or Firm* — Carr & Ferrell LLP

(57) ABSTRACT

Provided are cables for transmitting media data from media transmitters to receivers and methods of using such cables for charging the transmitters. In certain embodiments, power for such charging may be obtained by the cable from the media receiver during media data transmission and may be recycled back to the transmitter. In other embodiments, charging may be performed while no media data is transmitted. Power may be supplied by a media receiver still connected to the cable, by an external power source, or both devices simultaneously. A cable may be configured to prevent an automatic shutdown of the media receiver due to lack of media data transmission and to, thereby, maintain the receiver as a power source. Specifically, a cable may generate screen saver data and transmit this data to the receiver. The cable may include a converter board for providing various functions.

19 Claims, 5 Drawing Sheets

INTELLIGENT CABLE MECHANISM

CROSS-REFERENCE TO RELATED APPLICATIONS

This application claims the benefit of U.S. Provisional Application No. 61/442,131, filed Feb. 11, 2011, which is incorporated herein by reference in its entirety.

BACKGROUND

Mobile phones, tablet computers, and other types of wireless electronic devices are becoming increasingly popular as media generating, media retrieving, and media transmitting devices. To transmit media data, such as movie clips, pictures, and other types of data, from such electronic wireless devices, a cable is often used that communicatively couples the electronic device to another device, such as a computer, another electronic device, a video display device, an audio device, or a television (TV).

A cable typically includes two connectors, one for each of the interconnected devices, and electrical conductors coupling terminals of the two connectors. To transfer data via the cable, one of the connectors is coupled to a receptacle in one electronic device, while the other connector is coupled to a receptacle of another device. The connection completes one or more electrical circuits, which enables data to be transferred between the devices.

Various standards have been developed to enable electronic devices to exchange data, examples of which include universal serial bus (USB), fire wire, high-definition multimedia interface (HDMI), DisplayPort, and others. In order to accommodate each of these standards, dedicated data ports are typically employed in the electronic device. For example, an electronic device that has USB capability typically includes a dedicated port for a USB connector.

A pervasive trend with electronic devices is the reduction in size and increase in mobility of the electronic devices. Furthermore, the electronic devices have become more able to generate and retrieve media content. For example, many modern mobile phones are equipped with photo and video cameras, have significant storage capacity, and have relatively fast internet connectivity. Yet, the small sizes of these devices often make them inadequate for viewing various media content. Furthermore, these devices often depend on the availability of power supplied by their batteries.

SUMMARY

Provided are cables for transmitting media data from media transmitters to receivers, and the methods of using such cables for charging the transmitters. In certain embodiments, power for such charging may be obtained by the cable from the media receiver during media data transmission and may be recycled back to the transmitter. In other embodiments, charging may be performed while no media data is transmitted. Power may be supplied by a media receiver still connected to the cable, by an external power source, or both devices simultaneously. A cable may be configured to prevent an automatic shutdown of the media receiver due to lack of media data transmission and, thereby, to maintain the receiver as a power source. Specifically, a cable may generate screen saver data and transmit this data to the receiver. A cable may include a converter circuit on a printed circuit board, i.e., converter "board", for providing various functions.

In certain embodiments, a cable for transmitting media data includes a first connector having a first plurality of conductive points for establishing a connection with a media transmitter and a second connector having a second plurality of conductive points for establishing a connection with a media receiver. The cable also includes a converter board coupled between the first connector and the second connector. The converter board interconnects the first plurality of conductive points with the second plurality of conductive points for transmitting media data from the media transmitter to the media receiver. In certain embodiments, the converter board adjusts such connections based on the different types of connectors (e.g., when adapters are used) and devices attached to these connectors. The converter board is also configured to deliver an electrical power to the first plurality of conductive points for charging the transmitter. The electrical power is supplied to the converter board from one or more of the following sources: the media receiver and an external power source.

Some examples of media transmitters include a mobile phone, laptop, and tablet. Such devices generally have an internal power supply, such as a battery, that allows these devices to operate and produce media data. However, continuous operation of these devices may result in the discharging of the internal power source. When connected to a cable according to various embodiments, the device may be charged by the cable according to various different charging schemes further described below. A media transmitter typically has a port for connecting to a cable. The type of this port determines the type of the first connector. In certain embodiments, the first connector includes a micro-USB connector. In other embodiments, the first connector may have a mini-USB, USB 2.0, USB 3.0, Apple 30-pin connector, and other types of connectors.

Some examples of media receivers include a TV set, a display, and a projector. Typically, a media receiver is capable of producing video output and audio output. Thereby, in certain embodiments, media data transferred by a cable from a media transmitter to a media receiver includes a video component and audio component. In other embodiments, media data may only include a video component (e.g., when VGA or DVI types of connectors are used). In certain embodiments, the second connector of the cable includes an HDMI connector.

In certain embodiments, the converter board is integrated into a body that also encloses one of the connectors (e.g., the first connector for connecting to a media transmitter or the second connector for connecting a media receiver). In other embodiments, the converter board is integrated into the body that is flexibly attached to both connectors. Generally, the first connector is flexibly attached to the second connector regardless of the arrangement of the converter board. In certain embodiments, the first connector is a docking station that is configured to mechanically support the media transmitter in addition to forming various connections to the transmitter. The docking station may have its own power source for charging the transmitter. In the same or other embodiments, the converter board includes a power connector for connecting to the external power source.

Also provided is a method for charging a media transmitter using a cable for transmission of media data. The method may involve connecting a first connector of the cable to the media transmitter, identifying a connection of a second connector of the cable to a media receiver, and identifying connection of the cable to an external power source. The method may then proceed with applying a connection scheme from a plurality of connection schemes for charging the media transmitter. One example of these connection schemes includes a power down mode, which includes a connection and output from the media transmitter for identification of the second connector of the cable to the media receiver. Another example includes a power recycling mode that involves supplying a first power level supplied from the media receiver to the media transmitter. The power recycling mode may be selected when transmission of the media data from the media transmitter to the media receiver is performed. The first power level may be between about 1 mW and 300 mW.

Yet another example includes a full charging mode, which involves supplying a second power level supplied from the media receiver to the media transmitter. The full charging mode may be selected when there is no transmission of the media data from the media transmitter to the media receiver. The second power level may between about 1 mW and 500 mW. Notably, the second power level is higher than the first power level because no media data transmission occurs when the full charging mode is used.

An additional example of the connection schemes includes a normal charging mode. In this mode, a third power level is supplied from the media receiver to the media transmitter. This mode may be used when screen saver data is transmitted to the media receiver. The third power level may be between about 1 mW and 1000 mW. Additional power available to the cable or, more specifically, to the converter board of the cable may be used for screen saver data generation and transmission. Notably, the screen saver data is generated by the cable and not by the media transmitter. In this mode, the media transmitter may not provide any types of data over the cable and may only receive a charge from the cable. The screen saver data may include instructions for displaying a black screen on the media receiver. As mentioned above, the screen saver data is generated by the cable and may be based on identifying the connection of the second connector of the cable to the media receiver. Feeding the screen saver data into the receiver prevents the receiver from automatically powering down and, thereby, maintains the receiver as a power source for the receiver.

Yet another connection scheme includes a fast charging mode, in which a fourth power level is supplied from the external power source based on identifying the connection of the cable to the external power source. The fourth power level may be between about 1 mW and 10 W and notably much higher than power levels of other schemes. The fourth power level allows for rapid charging of the transmitter. In certain embodiments, a power source may be integrated into the cable.

In certain embodiments, the method may involve repeating identification of the connection of the second connector of the cable to the media receiver and identification of the connection of the cable to the external power source. Based on these identifications, the cable may select and apply a new connection scheme from the plurality of connection schemes for charging the media transmitter based on repeated identifications.

These and other embodiments are described further below with reference to the figures.

DETAILED DESCRIPTION

Figure 1:
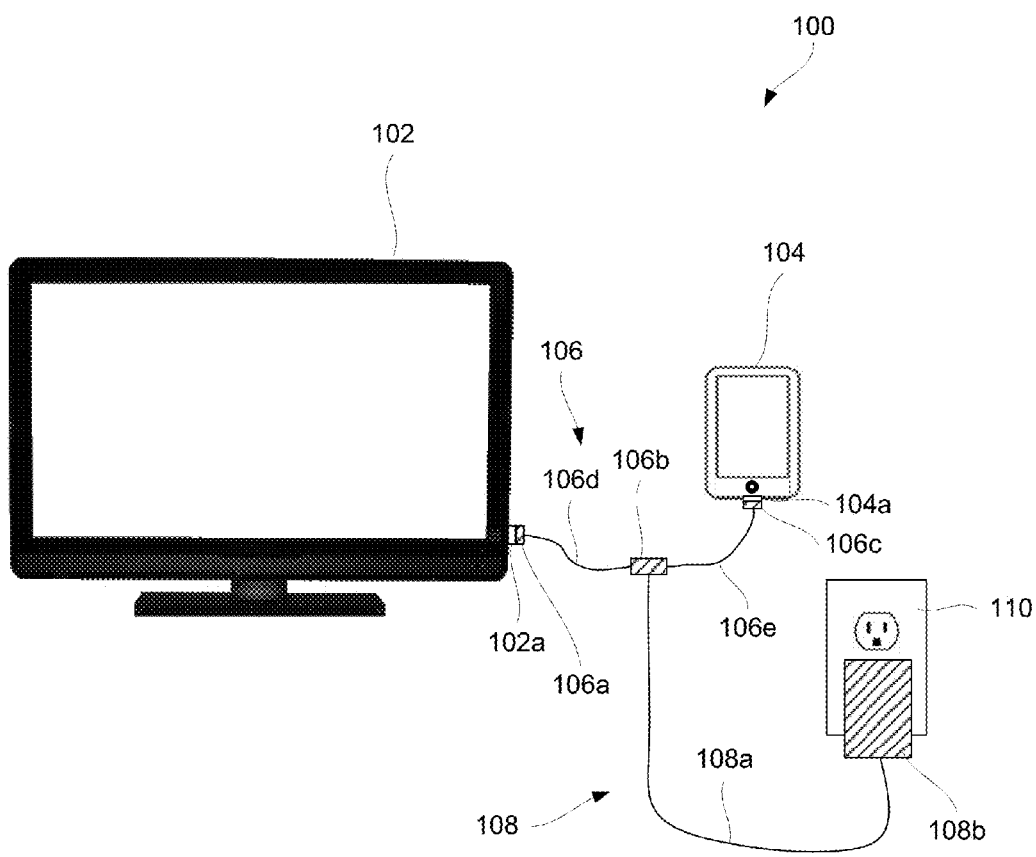
FIG. 1 is a schematic representation of a system including a media transmitter and media receiver interconnected by a cable, in accordance with certain embodiments.
Figure 2A:
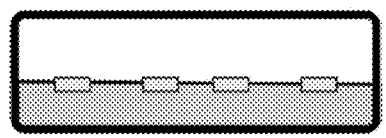
FIGS. 2A-2F are schematic representations of exemplary cable connectors for connecting to media transmitters, in accordance with certain embodiments.
Figure 2B:
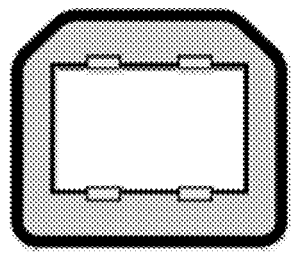
Figure 2C:
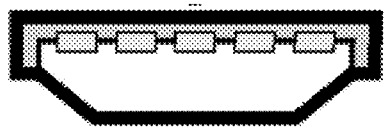
Figure 2D:
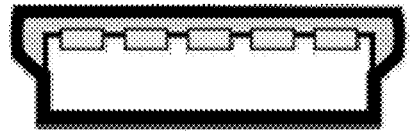
Figure 2E:
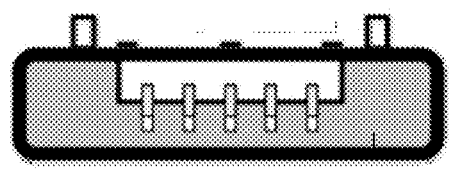
Figure 2F:
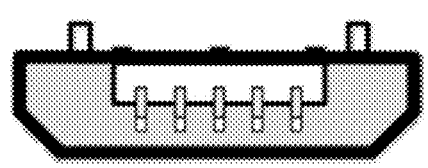

Various embodiments include an intelligent cable mechanism, which is often referred to as a cable, for interconnecting a media transmitter and media receiver and charging the transmitter from various power sources that may be connected to the cable. In a specific embodiment, a cable may be used for connecting a mobile device, such as a smart phone, with a high definition television (HDTV) or some other media receiver. Once connected, the cable may perform one or more of several functions that are further explained below. For example, the cable may detect connection types between the devices that are connected to the cables. The cable may switch communication lines extending to pluralities of conductive points of the connector, for example, based on a detected connection or change in connection. The cable may charge a device connected to the cable, such as media transmitter. Furthermore, the cable may be used for authentication of one or both devices connected to the cable. Other functions further described below are also within the scope.

Each one of these functions will now be specifically described. A charging feature of the cable may be used to charge one or both of the devices connected to the cable. For example, the intelligent cable mechanism may be used to interconnect a media device and mobile device. In a specific embodiment, a portion of the cable may be implemented as a docking station for the mobile device. Power for charging may be received from an external power source, such as a docking station power source or a power source connected to one of either the connector or converter board. For example, a voltage inverter supplying about 5V DC may be used as an external power source. It should be noted that the term "external" is used merely to distinguish the source of the power. The external power is thereby distinguished from the power provided to the cable by the connector of one or both interconnected devices, which may be referred to as an "internal" power. The internal power is generally limited and, in certain embodiments, is substantially lower than the "external" power. Furthermore, some internal power may be consumed during media data transmission and other functions of the cable as further explained below.

In other embodiments, the power to one of the connected devices may be provided by another device. For example, an HDMI port of a TV set may be used as a power source to charge a mobile device connected to the other end of the cable. Such internal power transfer may be performed while media data is also being transferred between the TV set and the mobile device. A different kind of power transfer may occur when no data transfer occurs. For example, a mobile device may be charged while an active video stream is communicated over the intelligent cable mechanism or while no active video stream is communicated over the intelligent cable mechanism. Furthermore, the cable itself may generate some data stream to deliver to one of the devices to prevent this device from shutting down or going into a power saving mode.

In the same or other embodiments, the intelligent cable mechanism may include a chip authentication mechanism. The chip authentication may have a logic that authenticates one or more devices connected to the cable. Alternatively or in addition to these embodiments, the cable may be authenticated by one or both connected devices. For example, a cable may include a unique identification verifiable by a mobile device when connected to the cable. If the cable is authenticated, the cable may be used to transmit data to a media device. If the cable is not authenticated, the cable may not be used to transmit data to a media device. In some embodiments, the authentication may be performed between logic located at different locations among a mobile device connected to one end of the intelligent cable mechanism, the media device connected to the other end of the intelligent cable mechanism, and the intelligent cable mechanism.

In certain embodiments, the intelligent cable mechanism includes a wiring mechanism that is configured to detect and differentiate among various types of connections made to the cable. For example, the mechanism may determine that a connection is not a USB type connection, and therefore will not send data via USB 2.0 or 3.0 protocols. Instead, other protocols will be used, such as high definition video and audio data.

In certain embodiments, the intelligent cable mechanism includes a switching mechanism, which is able to switch between different connection protocols. The cable may allow a first type of data associated with a first connector to pass over a first data link. The cable may also detect a connection of its second connector. The cable may switch from the first data link to a second data link. For example, the cable may switch from a USB link to a high definition audio-video link. This feature may be combined with the authentication feature. In the above example, the authentication process may occur, and the second link may be used to transmit data associated with the second connector. In some embodiments, the cable may detect the change in connection type, change a data transmission link within the cable, and indicate to a mobile device connected to the cable that the cable is ready to transfer data. In some embodiments, the cable may detect the change in connection type, instruct an external entity to change the data transmission link (for example, a processing unit within the mobile device), and indicate to the mobile device connected to the cable that the cable is ready to transfer data.

Also provided are various structural features, circuitry, and components for performing the functionality described herein, including connectors, data link mechanisms (such as wires that communicate data between two or more connectors), and other components. The cable may include one or more processors, which execute instructions stored in memory, with the executed instructions causing one or more processors to perform the functions discussed herein.

Some of these features will now be explained in more detail with reference to various figures. FIG. 1 is a schematic representation of system 100 including media transmitter 104 and media receiver 102 interconnected by intelligent cable mechanism 106, in accordance with certain embodiments. Some examples of media transmitter 104 include mobile computers, smartphones, tablet computers, handheld game consoles, portable media players, digital still cameras (DSC), digital video cameras (DVC or digital camcorder). Generally, these devices are battery powered and need to be periodically charged. Some examples of media receiver 102 include various audio-video systems, TV sets, computer displays, and video projectors.

Media receiver 102 is shown to have input data port 102a, while media transmitter 104 is shown to have output data port 104a. In certain embodiments, the same port may be an input port in one operation and an output port in another operation. For simplicity, examples presented in this document are focused on media transmitter 104 sending media data and media receiver 102 receiving this data. However, one having ordinary skill in the art would understand that various other types of data flows may be used. Furthermore, as described above, in certain situations, there is no data received from media transmitter 104 and/or transmitted to media receiver 102. In certain embodiments, data transmitted to media receiver 102 may be generated by intelligent cable mechanism 106.

Various examples of input data port 102a and output data port 104a are presented in FIGS. 2A-2F and FIGS. 3A-3D. Specifically, FIGS. 2A-2F are schematic representations of exemplary cable connectors for connecting to media transmitters, in accordance with certain embodiments. These represent various different types of USB cables, such as standard type A, standard type B, mini-A type USB, mini-B type USB, micro-A type USB, micro-B type USB, and other types. The USB 2.0 standard mini and micro connectors each have five connector pins, e.g., FIGS. 2C-2E, which are sometimes referred to as conductive points. One of these pins is used to provide electrical power and is usually maintained at a voltage of about 5V. Two other pins are used for data transmission (i.e., "Data+" and "Data−"). Yet another pin is used to distinguish between A-type and B-type USB connectors. Finally, the last pin may be used for signal ground.

Figure 3A:
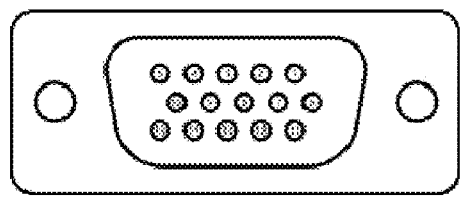
FIGS. 3A-3D are schematic representations of exemplary cable connectors for connecting to media receivers, in accordance with certain embodiments.
Figure 3B:
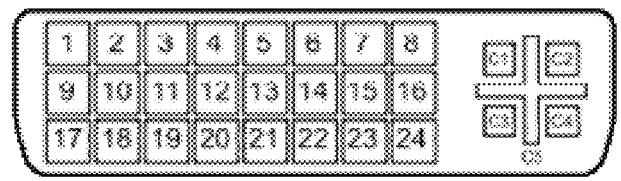
Figure 3C:
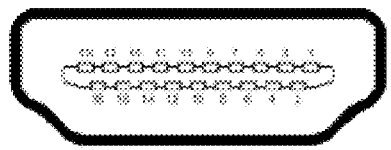
Figure 3D:
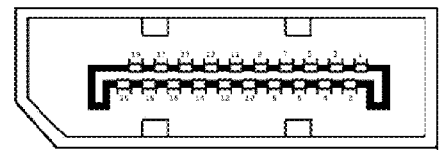

FIGS. 3A-3D are schematic representations of exemplary cable connectors for connecting to media receivers, in accordance with certain embodiments. Specifically FIG. 3A depicts a 15-pin VGA connector, FIG. 3B depicts a DVI-I connector, FIG. 3C depicts a 19-pin HDMI connector, and, finally, FIG. 3D depicts a 20-pin DisplayPort external source side connector. Each one of these connectors may include one electrical power pin, which may operate at about 5V or about 3.3V or some other standard voltage rating.

Returning to FIG. 1, intelligent cable mechanism 106 includes first connector 106c including a first plurality of conductive points (not visible) for establishing corresponding connections to pins of output data port 104a. Likewise, intelligent cable mechanism 106 includes second connector 106a including a second plurality of conductive points for establishing corresponding connections with pins of input data port 102a.

Intelligent cable mechanism 106 is also shown to include converter board 106b provided between first connector 106c and second connector 106a and interconnecting the first plurality of conductive points with the second plurality of conductive points. These interconnections between the two sets of conductive points provide transmission of media data from media transmitter 104 to media receiver 102 in certain embodiments. These interconnections, which may be according to the same or different interconnection schemes, may also be used for supplying electrical power to media transmitter 104 in various embodiments. Converter board 106b is configured to deliver an electrical power to the first plurality of conductive points of first connector 106c for charging media transmitter 104. This electrical power may be supplied to converter board 106b by media receiver 102 and/or external power source 108b as will be further explained in more details.

Converter board 106b may be integrated into the same physical enclosure with first connector 106c. Alternatively, converter board 106b may be integrated into the same physical enclosure with second connector 106a. In yet other embodiments, converter board 106b is not integrated into the same physical enclosure with either first connector 106c or second connector 106a. For example, first flexible wiring 106e may be provided between converter board 106b and first connector 106c, and second flexible wiring 106d may be provided between converter board 106b and second connector 106a as shown in FIG. 1. Regardless of the integration schemes presented above, first connector 106c and second connector 106a are flexibly attached to each other in various embodiments.

Intelligent cable mechanism 106 may also include external power source 108b of an assembly 108, which may be coupled to converter board 106b by power cord 108a of the assembly 108. The external power source 108b may also be coupled to a socket 110, which is in turn coupled to a source of AC power. In certain embodiments, some components of external power source 108b may be integrated into converter board 106b. For example, converter board 106b may have a voltage inverter and other components typically present in power sources. In other embodiments, external power source 108b may be a separate component from intelligent cable mechanism 106. In these embodiments, converter board 106b may include a power plug for connecting to power cord 108a of external power source 108b.

Figure 4:
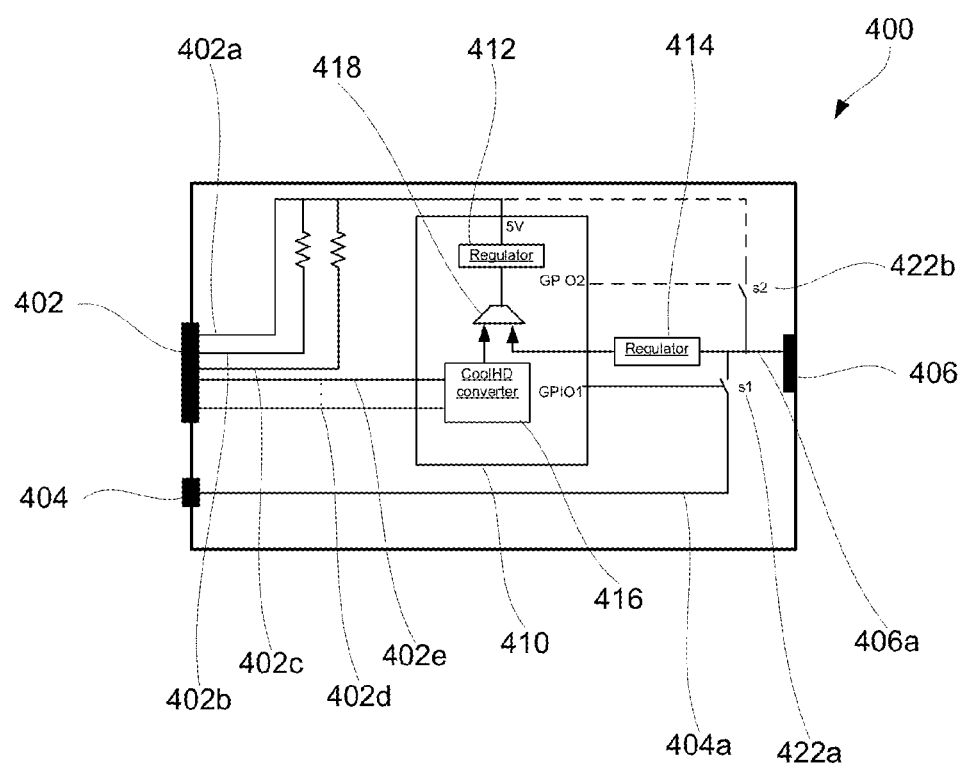
FIG. 4 is a schematic representation of selected electrical components of the converter board of the cable, in accordance with certain embodiments.

FIG. 4 is a schematic representation 400 of selected electrical components of converter board 106b of intelligent cable mechanism 106, in accordance with certain embodiments. Converter board 106b is shown to include three connectors 402, 404, and 406. These may be either pluggable connectors for plugging, for example, generic cables, such as HDMI and micro-USB cable, or interfaces for cables entering converter board 106b. The difference between plugged connectors and interfaces is whether the cable can be unplugged from converter board 106b. When elements 402, 404, and 406 represent interfaces, the corresponding cables cannot be plugged or unplugged. For simplicity, both interfaces and pluggable connectors are referred to herein as connectors.

Connector 402 represents an output connector of converter board 106b and may be any type of connector as described above. Connector 406 represents an input connector of converter board 106b. Various types of input connectors are also described above. Finally, connector 404 represents a power connector, which may be connected, for example, to a DC power source (e.g., external power source 108b in FIG. 1) that may provide a voltage of about 5V.

In the example shown in FIG. 4, connector 402 may represent an HDMI connector having five leads 402a-402e. Lead 402a represents a power lead and may be connected to regulator 412. Leads 402b and 402c represent Display Data Channel (DDC) leads, while leads 402d and 402e represent data lines (e.g., Transition Minimized Differential Signaling (TMDS) data lines) connected to converter 416 (shown as "CoolHD converter" in the example in FIG. 4). Converter 416 may provide one of the inputs to multiplexer 418, which in turn may control regulator 412. Another input into multiplexer 418 may be provided by another regulator 414, which may be connected to input connector 406. Converter board 106b may also include various switches 422a and 422b.

Converter board 106b may provide one of various charging schemes. For example, the charging of a media transmitter (e.g., 104 in FIG. 1) connected to connector 406 may be based on an external power source connected to connector 404. In this scenario, the external power can charge the media transmitter while powering converter 416, if needed. Switch 51 (element 422a) may be included for controlling the connection of line 404a extending from power connector 404 to power line 406a of input connector 406. The media transmitter connected to input connector 406 controls the GPIO1 signal through C-wire communication extending into receiver 410, thereby controlling switch 51 (element 422a). (Further details regarding the C-wire communication may be found in U.S. patent application Ser. No. 13/365,624, included by reference herein). In such a way, the media transmitter may decide whether to charge itself or not, depending, for example, on its current state of charge. Switch 51 (element 422a) may be actuated whether or not a media receiver is connected to connector 402.

In another charging scheme, the power output of receiver 410 generated during operation of receiver 410 (e.g., during transmission of the media data or, more specifically, while an active video stream is playing) is transmitted to connector 406. (Further details regarding the generating of power during operation of the receiver may be found in U.S. patent application Ser. No. 12/220,411, included by reference herein). In this exemplary charging scheme, the power is provided to power line 406a of connector 406 through another switch S2 (element 422b). Switch S2 is controlled by GPIO2 output of receiver 410. The power transmission in this example is shown with dashed line in FIG. 4. Notably, in this example, receiver 410 may be powered by lead 402a of output connector 402. This power is shared for media data transmission (e.g., to drive active video) and for charging the media transmitter connected to connector 406. As such, the charging capability may be very limited and may be used mainly to extend the battery life of the media transmitter (i.e., to prevent further power drain during operation) rather than for charging.

In another charging scheme, receiver 410 powers the media transmitter connected to connector 402 while no data is transmitted (e.g., no active video stream is playing). This scheme is different from the previous one, since less power is consumed by receiver 410 and more power can be distributed to connector 406 or, more specifically, its power line 406a.

Figure 5:
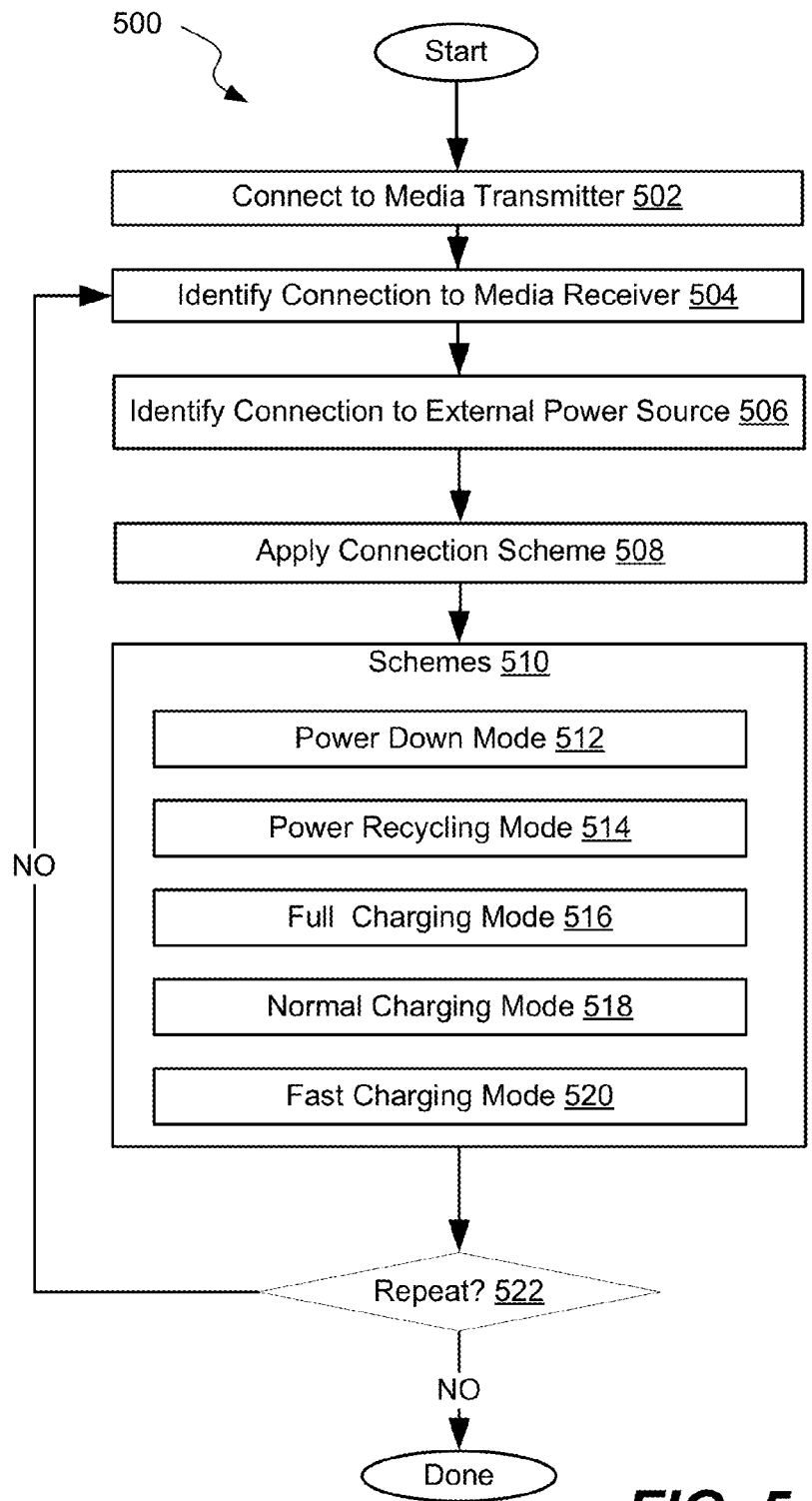
FIG. 5 is a process flowchart of a method for charging a media transmitter using a cable for transmission of media data, in accordance with certain embodiments.

FIG. 5 is a process flowchart of method 500 for charging a media transmitter using a cable for transmission of media data, in accordance with certain embodiments. Method 500 may commence with connecting one of the connectors (i.e., a first connector) of the intelligent cable mechanism to a media transmitter during operation 502. Various examples of media transmitters and connectors are described above. This connection may also provide power (at least initially) to the cable or, more specifically, to the receiver. This power may be relatively negligible relative to other power transmissions described with reference to other schemes. The power may be used to detect connection of a second connecter to a media receiver. This power scheme is reflected in the first column in Table 1 below.

Method 500 may proceed with identifying a connection of a second connector of the cable to a media receiver during operation 504. As stated above, connection to the media transmitter during operation 502 may provide sufficient power to the cable to perform operation 504. The output of operation 504 may be either identifying that the media receiver is connected to the second connector or identifying that the media receiver is not connected to the second connector. This determines which power schemes may be used. For example, if it was identified that the media receiver is connected to the second connector, then the power may be provided by the media receiver in addition to or instead of the power provided by the external source. The level of power provided by the media receiver may depend on the media data transmission and may be higher if no media data is transmitted and lower if media data is transmitted.

Method 500 may proceed with identifying connection of the cable to an external power source during operation 506. In certain embodiments, this operation is performed before identifying connection of the cable to a media receiver. It should be noted that an order of cable connections could be different from an order of connection identification operations. Furthermore, cable connection operations may be performed continuously and any changes to cable connections (e.g., losing previous connections or establishing new connections) may be immediately detected by the receiver of the intelligent cable mechanism. This detection may be reflected in changes to the connection schemes further described below with reference to operation 510.

Returning to operation 506, the output of this operation may be either identifying that the media receiver is connected to the power source or identifying that the media receiver is not connected to the power source. This determines which power schemes may be used as presented in Table 1 below and described with reference to operation 510. For example, if it was identified that the media receiver is connected to the power source, then the power may be provided by the power source in addition to or instead of the power provided by the media receiver.

Method 500 may then proceed with applying a connection scheme from a plurality of connection schemes for charging the media transmitter during operation 508. Examples of different connections schemes are presented in Table 1 below.

TABLE 1

|  | Power Down Mode | Power Recycling Mode | Full Charging Mode | Normal Charging Mode | Fast Charging Mode |
| --- | --- | --- | --- | --- | --- |
| Media Receiver Connected? | No | Yes | Yes | Yes | No* |
| Power Source Connected? | No | No | No | No | Yes |
| Media Data Transmitted? | No | Yes | No | No | No* |
| Screen Saver Generated? | No | No | No | Yes | No |
| Power to Media Transmitter, mW | — | 1-300 | 1-500 | 1-1000 | 1-10,000 |

Each one of these examples will now be explained in more detail. When it is determined that neither the media receiver nor power source are connected to the cable, the cable may go into the power down mode (block 512). In this mode, the cable is connected to the media transmitter, and this connection is used to power the cable for identification of the second connector of the cable to the media receiver. No media data is transmitted through the cable or screen saver data generated by the cable in this mode, as there is no media receiver connected to the cable. Furthermore, there is no charging of the media transmitter performed in this mode as no other power source is connected to the cable.

Another example includes a power recycling mode (block 514). This mode may be selected when the media receiver is connected to the cable, and the cable is used to transmit data from the transmitter to the receiver. As such, no screen saver data needs to be generated by the cable. The power source may or may not be connected to the cable in this mode. This power recycling mode involves supplying a first power level from the media receiver to the media transmitter and may be between about 1 mW and 300 mW.

Yet another example includes a full charging mode (block 516). This mode may be selected when the media receiver is connected to the cable, but the cable is not used to transmit any media data from the transmitter to the receiver. Furthermore, no screen saver data is generated by the cable. For example, a media receiver may be configured to remain in the power mode even though no data is transmitted to the receiver. The power source may or may not be connected to the cable in this mode. This mode involves supplying a second power level from the media receiver to the media transmitter and may be between about 1 mW and 500 mW. Notably, the second power level is higher than the first power level because no media data transmission occurs when the full charging mode is used.

An additional example of the connection schemes includes a normal charging mode (block 518). This mode may be selected when the media receiver is connected to the cable, but the cable is not used to transmit any media data from the transmitter to the receiver. However, the screen saver data is now generated by the cable. For example, a media receiver may be configured to go into a power saving mode when no data is transmitted to the receiver. The power source may or may not be connected to the cable in this mode. This mode involves supplying a third power level from the media receiver to the media transmitter and may be between about 1 mW and 1000 mW.

The last connection scheme presented in Table 1 and FIG. 5 is a fast charging mode (block 520). In this mode, the external power source is connected to the cable. The media receiver may or may not be connected to the cable. If a media receiver is connected to the cable, it may be used to transmit the media data, as in the power recycling mode described above. In the fast charging mode, a fourth power level is supplied from the external power source, which may be between about 1 mW and 10 W. This power level is notably much higher than the power levels of other schemes. The fourth power level allows rapid charging of the transmitter. In certain embodiments, a power source may be integrated into the cable.

In certain embodiments, the method may involve repeating identification of the connection of the second connector of the cable to the media receiver and identification of the connection of the cable to the external power source, as reflected by decision block 522. Based on these identifications, the cable may select and apply a new connection scheme from the plurality of connection schemes for charging the media transmitter based on repeated identifications.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A cable for transmitting media data, the cable comprising:

a first connector comprising a first plurality of conductive points for establishing a connection with a media transmitter;

a second connector comprising a second plurality of conductive points for establishing a connection with a media receiver; and
a converter circuit provided between the first connector and the second connector and interconnecting the first plurality of conductive points with the second plurality of conductive points for transmitting media data from the media transmitter to the media receiver,
wherein the converter circuit is configured to deliver electrical power to the first plurality of conductive points for charging the media transmitter, the electrical power selectively supplied to the converter circuit from one of the media receiver and an external power source, the converter circuit configured to select from the one of the media receiver and the external power source for supply of the electrical power based on a connection status.

2. The cable of claim 1, wherein the media transmitter comprises one or more devices selected from a group consisting of: a mobile phone, a laptop, and a tablet.

3. The cable of claim 1, wherein the first connector comprises a micro-USB connector.

4. The cable of claim 1, wherein the media receiver comprises one or more devices selected from a group consisting of: a TV set, a display, and a projector.

5. The cable of claim 1, wherein the second connector comprises an HDMI connector.

6. The cable of claim 1, wherein the converter circuit is integrated into a body enclosing the first connector.

7. The cable of claim 1, wherein the converter circuit is integrated into a body enclosing the second connector.

8. The cable of claim 1, wherein the first connector is flexibly attached to the second connector.

9. The cable of claim 1, wherein the first connector is a docking station.

10. The cable of claim 1, wherein the converter circuit comprises a power connector for connecting to the external power source.

11. A method for charging a media transmitter using a cable for transmission of media data, the method comprising:
connecting a first connector of the cable to the media transmitter;
identifying a connection of a second connector of the cable to a media receiver; and
applying a connection scheme from a plurality of connection schemes for charging the media transmitter, the plurality of connection schemes comprising:
i) a power down mode comprising an output from the media transmitter for identification of the second connector of the cable to the media receiver;
ii) a power recycling mode for supplying power at a first power level to the media transmitter, the power being supplied from the media receiver, the power recycling mode corresponding to transmission of the media data from the media transmitter to the media receiver; and
iii) a full charging mode for supplying power at a second power level to the media transmitter, the power being supplied from the media receiver, the full charging mode corresponding to no transmission of the media data from the media transmitter to the media receiver.

12. The method of claim 11, wherein the plurality of connection schemes further comprises a normal charging mode for supplying power at a third power level to the media transmitter, the power being supplied from the media receiver, the normal charging mode corresponding to transmission of screen saver data to the media receiver.

13. The method of claim 12, wherein the third power level is between about 50 mW and 150 mW.

14. The method of claim 12, wherein the screen saver data comprises instructions for displaying a black screen on the media receiver.

15. The method of claim 12, wherein the screen saver data is generated by the cable based on identifying the connection of the second connector of the cable to the media receiver.

16. The method of claim 11, further comprising identifying connection of the cable to an external power source, wherein the plurality of connection schemes further comprises a fast charging mode comprising a fourth power level supplied from the external power source based on identifying connection of the cable to the external power source.

17. The method of claim 16, wherein the fourth power level is between about 500 mW and 5 W.

18. The method of claim 11, wherein:
the first power level is between about 20 mW and 100 mW; and
the second power level is between about 100 mW and 300 mW.

19. The method of claim 11, further comprising:
repeating identification of the connection of the second connector of the cable to the media receiver and identification of the connection of the cable to an external power source; and
applying a new connection scheme from the plurality of connection schemes for charging the media transmitter based on repeated identifications.

* * * * *